United States Patent [15] 3,670,166
Kaminow [45] June 13, 1972

[54] TIME DIVISION MULTIPLEX OPTICAL COMMUNICATION SYSTEM

[72] Inventor: Ivan Paul Kaminow, New Shrewsbury, N.J.

[73] Assignee: Bell Telephone Laboratories, Incorporated, Murray Hill, N.J.

[22] Filed: Dec. 28, 1970

[21] Appl. No.: 101,980

[52] U.S. Cl. ....250/199
[51] Int. Cl. ....H04b 9/00
[58] Field of Search ....250/199; 350/150

[56] References Cited

UNITED STATES PATENTS 3,532,890 10/1970 Denton ....250/199

*Primary Examiner*—Robert L. Richardson
*Assistant Examiner*—Kenneth W. Weinstein
*Attorney*—R. J. Guenther and Arthur J. Torsiglieri

[57] ABSTRACT

Time-division multiplexing and demultiplexing of N optical, pulse code modulated signals is achieved by means of a cascaded array of N polarization rotators and associated polarization selective prisms. At the multiplexer, the N pulse-encoded signals, polarized along a first direction, are coupled bit-by-bit into the respective rotators by means of their associated prisms. Simultaneously, pulses, having a repetition rate equal to the bit rate of the individual signals are applied to all of the rotators, including a 90° rotation in the direction of polarization of the signals. This permits the signals to pass through the rotator-prism pairs and to enter into a common transmission path as a time-division multiplexed signal. At the receiver, the multiplexed signal enters a demultiplexer comprising an identical array of polarization rotators and polarization prisms. Simultaneously, synchronized pulses, applied to the rotators, effect a 90° rotation in the direction of polarization of the signals, causing the prism to deflect each of the signals, bit-by-bit along W different wavepaths.

In a second embodiment, traveling electrical pulses are employed to produce the 90° rotation of the signal polarization.

9 Claims, 7 Drawing Figures

INVENTOR
BY I. P. KAMINOW
Sylvan Sherman
ATTORNEY

TIME DIVISION MULTIPLEX OPTICAL COMMUNICATION SYSTEM

This invention relates to multiplexing and demultiplexing apparatus for use in optical pulse code modulation (PCM) communication systems.

BACKGROUND OF THE INVENTION

One of the purposes of the multiplexing technique is to increase the information-handling capacity of a communication system. It is inevitable, therefore, that this technique will be adapted and used in optical pulse code modulation systems, where the designation "optical" includes the infrared, the visible and the ultraviolet portions of the frequency spectrum.

In a time-division multiplexed communication system, to which the invention relates, a single transmission facility serves as a transmission link for a number of pulse-encoded signals. In such a system, the several pulse trains, representing each of the N pulse-encoded signals to be transmitted, are interleaved in a predetermined manner to form a single pulse train having a bit rate that is N times greater than that of any of the individual channels. The process of interleaving is known as multiplexing.

At the receiver, the several PCM channels that had been interleaved and transmitted together, are separated and individually decoded. The process of separating is known as demultiplexing.

SUMMARY OF THE INVENTION

Time-division multiplexing and demultiplexing of N optical, pulse code modulated signals is achieved, in accordance with the present invention, by means of a cascaded array of N polarization rotators and N associated polarization selective prisms whose spatial separation corresponds to the temporal separation between adjacent information bits of the multiplexed signal. In a first embodiment of a multiplexer, each of the N pulse-encoded optical signals, polarized along a common direction, is coupled bit-by-bit into a different one of the N rotators by means of its associated prism. Simultaneously, electrical pulses, having a repetition rate equal to the pulse repetition (or bit) rate of the individual signals, are applied to all the rotators, inducing a 90° rotation in the direction of polarization of the signals. This rotation permits the signals to pass through the successive rotator-prism pairs and to enter into a common transmission path as a time-division multiplexed signal.

At the receiver, the process is reversed. The signals, polarized along a common direction, enter a demultiplexer comprising an identical cascaded array of polarization rotators and prisms. With the rotators and prisms adapted to transmit waves polarized along said common direction, the N multiplexed signals propagate along and fill the demultiplexer. Simultaneously, synchronized pulses, applied to the rotators, effect a 90° rotation in the direction of polarization of the signals, causing the prisms to deflect each of the signals, bit-by-bit, along N different wavepaths.

In a second embodiment of the invention, traveling electrical pulses are employed to produce the 90° rotation of the signal polarization.

These and other objects and advantages, the nature of the present invention, and its various features, will appear more fully upon consideration of the various illustrative embodiments now to be described in detail in connection with the accompanying drawings.

DETAILED DESCRIPTION

Figure 1:
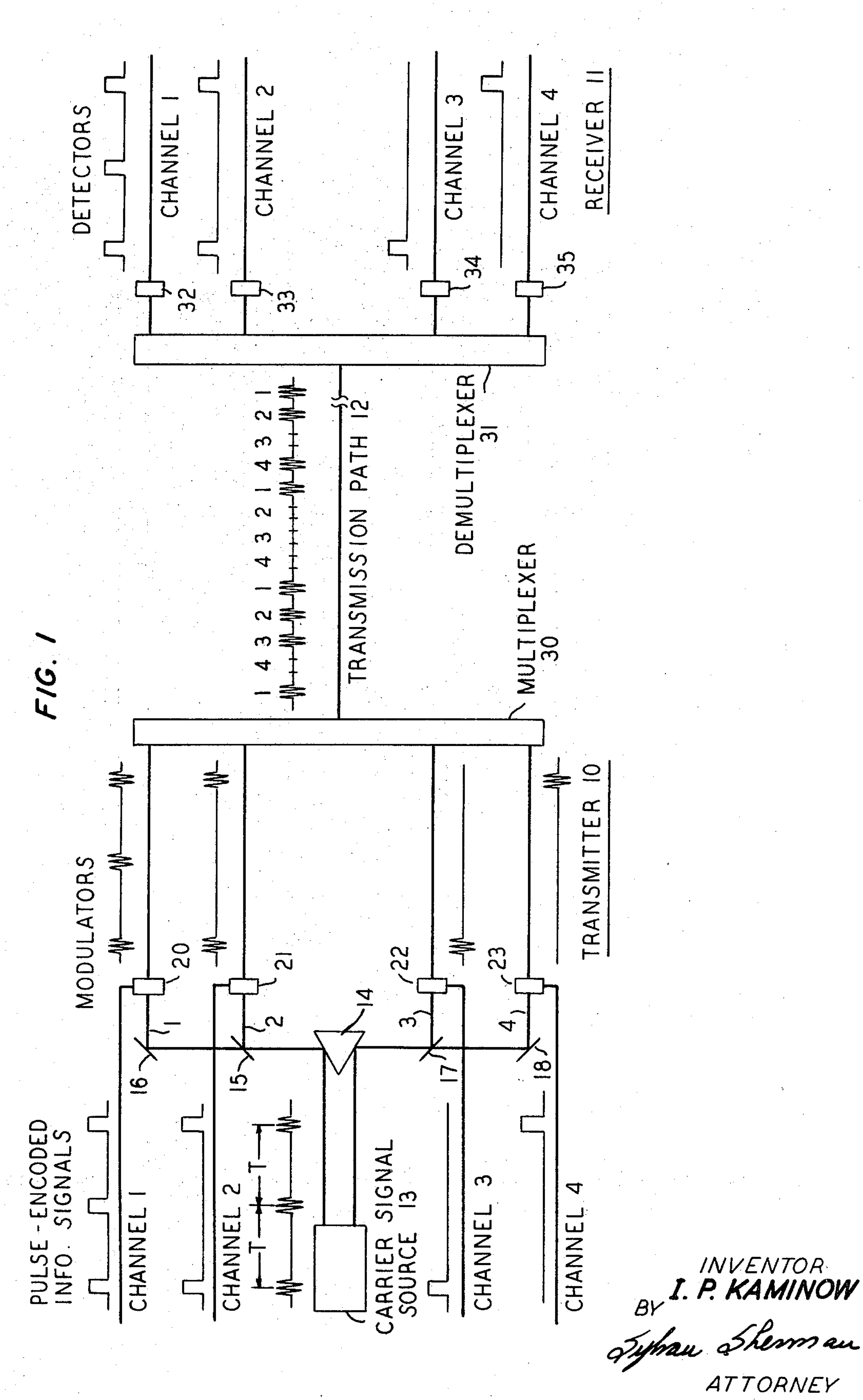
FIG. 1 shows, in block diagram, a typical time-division multiplex communication system.

Referring to the drawing, FIG. 1 shows, in block diagram, a time-division multiplex communication system comprising a transmitter 10, a receiver 11, and an interconnecting transmission path 12. More specifically, transmitter 10 includes a carrier signal source 13, such as a mode-locked laser, whose output consists of a train of optical pulses having a pulse repetition (or bit) rate $F = 1/T$, where $T$ is the period between pulses. Means, comprising a bank of partially and totally reflecting mirrors 14, 15, 16, 17 and 18, divide the carrier beam into a plurality of N different beams directed along N different wavepaths. For purposes of illustration, four beams 1, 2, 3 and 4 are shown.

Each of the four carrier beams are directed to a different modulator 20, 21, 22 and 23 along with a base-band binary, pulse-encoded information signal. The latter has the same bit rate as the carrier signal, and is synchronized therewith such that a carrier signal pulse is passed by the modulators for one binary state of the information signal, but blocked for the other binary state of the information signal. Thus, for the illustrative three-bit channel 1 information signal, comprising three marks (111), the signal at the output of modulator 20 comprises three carrier pulses. The channel 2 information signal, comprising a mark, a space, and a mark (101) produces, correspondingly, at the output of modulator 21, a signal comprising a carrier pulse, followed by a space and a second carrier pulse. Similarly, for the remaining two channels, the output from modulator 22 comprises two spaces followed by a carrier pulse, while the output from modulator 23 comprises a carrier pulse followed by two spaces.

Because the information handling capacitor of transmission path 12 is typically greater than the bit rate of the individual channel signals, the four channels are advantageously combined by means, such as a time-division multiplexer 30, which interleaves the four carrier signals, producing a resulting signal whose bit rate is equal to NF, where N is an integer, equal to the number of multiplexed channels. In the illustrative case, N = 4. Thus, basically, the function of the multiplexer is to combine the separate channel signals into one composite signal along a common wavepath. Stated another way, the multiplexer converts the spatially separated signals into temporally separated signals.

At the receiver the process is reversed, and the four temporally separated signals are spatially separated by means of a demultiplexer 31. The base-band information is then recovered by means of suitable detectors 32, 33, 34 and 35. In an optical system, photosensitive diodes or photomultiplier tubes are used for this purpose.

Figure 2:
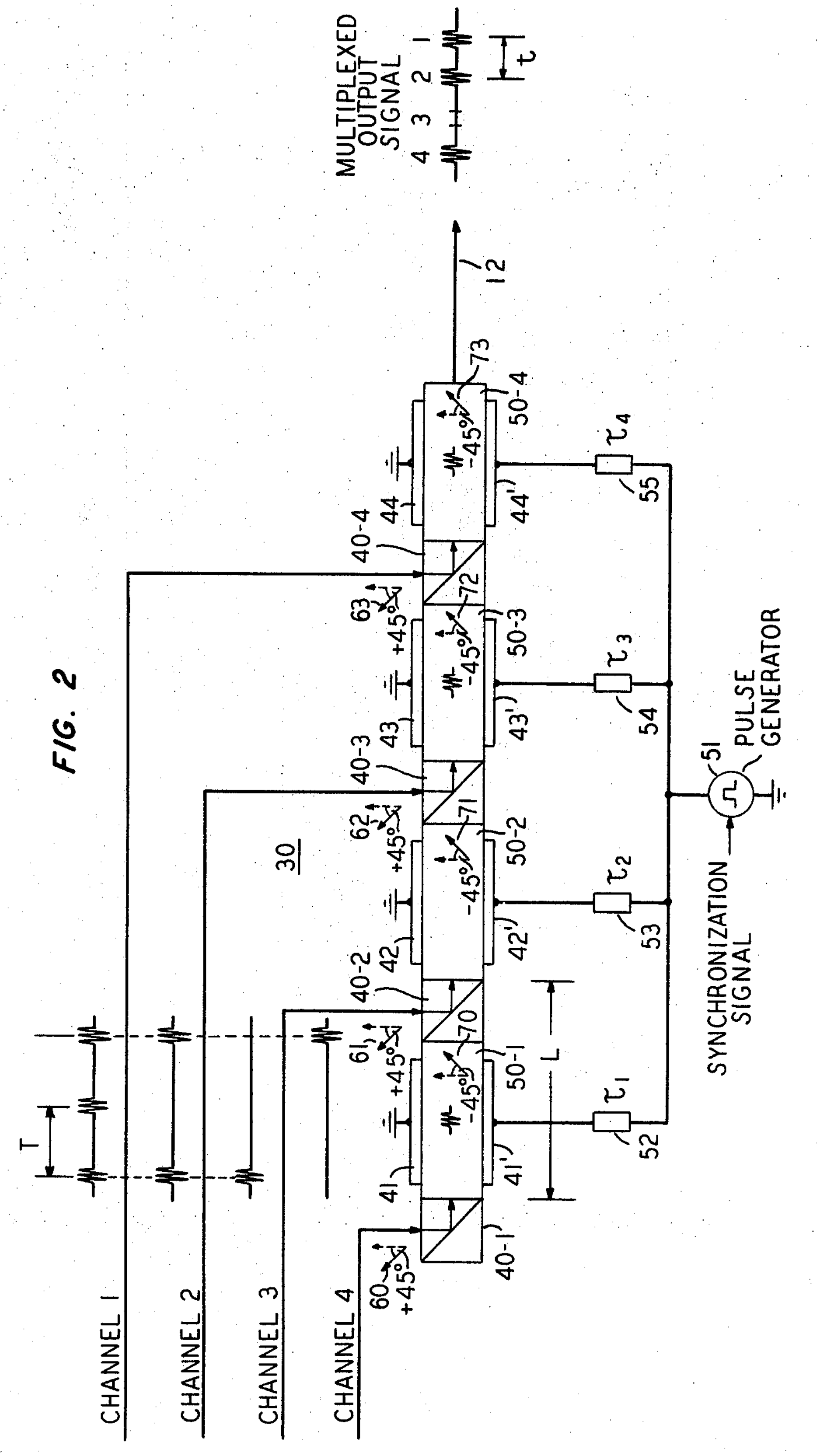
FIG. 2 shows apparatus, in accordance with the present invention, for multiplexing and demultiplexing pulse-encoded optical signals.

FIG. 2, now to be described, shows apparatus, in accordance with the present invention, for multiplexing and demultiplexing a plurality of pulse-encoded optical signals. Since the device to be described is reciprocal, it can be used for either function, as will be explained hereinbelow. In either case, the multiplexer (demultiplexer) comprises a cascaded array of polarization selective prisms 40–1, 40–2, 40–3 and 40–4, separated by means of an equal number of polarization rotators 50–1, 50–2, 50–3 and 50–4. Associated with the several rotators are means for impressing a biasing field for electrooptically modulating the birefringence of the rotator material. In the illustrative embodiment, a transverse electric field is impressed across each of the rotators by means of pairs of electrodes, 41–41′, 42–42′, 43–43′ and 44–44′. In particular, electrodes 41, 42, 43 and 44 are grounded, while electrodes 41′, 42′, 43′ and 44′ are connected to a pulse generator 51 by means of delay equalizers 52, 53, 54 and 55, respectively.

While only four prism-rotator pairs are shown, it is understood that, more generally, there will be as many prism-rotator pairs as there are channels to be multiplexed and demultiplexed.

As is known, a polarization selective prism, such as the Glan-Thompson prism, has the property that it passes waves of one selected polarization, but deflects waves polarized orthogonally to the selected polarization. For purposes of the following discussion, wherein the biasing field is directed vertically, prisms 40 are such that waves polarized at +45° to the vertical direction, as indicated by arrows 60, 61, 62 and 63, are deflected by the prisms, while waves polarized at −45° to the vertical direction, as indicated by arrows 70, 71, 72 and 73 are passed by the prisms.

The rotators 50 are such that in the absence of a biasing pulse, an incident wave experiences no birefringence and retains its direction of polarization as it traverses the rotator. In the presence of a biasing pulse, on the other hand, the polarization of the wave is rotated 90°.

In operation, each of the four carrier signals are coupled, respectively, into a side port of a different one of the prisms. The four signals, being polarized at +45° to the vertical and in time synchronism, are deflected by the prisms and directed into the associated rotators, arriving there at exactly the same time. Simultaneously, a biasing pulse is impressed across the four rotators, causing the wave polarization of the carrier signal waves to be rotated 90° as they traverse the rotators. The carrier waves are, therefore, polarized at −45° to the vertical as they leave their respective rotators and enter into the next adjacent prisms. Since each prism transmits waves polarized at −45°, the channel 2, 3 and 4 waves pass through prisms 40–2, 40–3 and 40–4, respectively, and enter into the next adjacent rotators 50–2, 50–3 and 50–4. The channel 1 wave, having passed through rotator 50–4, leaves the multiplexer.

Having induced the above-indicated 90° polarization rotation in the carrier signals, the biasing pulses terminate and the signals experience no further polarization rotation. Since each prism passes waves polarized at −45°, the signals continue through the multiplexer and into the common wavepath 12.

The temporal separation $t$ between adjacent channels is related to the spatial distribution of the multiplexer elements by $L/v_o$, where L is the repeat distance between adjacent rotators-prism pairs, and $v_o$ is the optical pulse velocity in the multiplexer. For an N channel system in which $T$ is the bit repetition period per channel, the length L and/or the velocity $v_o$ are adjusted such that $$t = T/N = L/v_o \,. \quad (1)$$

As the channel 4 signal leaves rotator 50–4, the next signal bits enter their respective prisms and the process is repeated. The result is to interleave the four channel signals for transmission along a common wavepath. Thus, the first multiplexed group, as shown in FIG. 2, comprises a sequence of signal bits including a carrier pulse from each of channels 1, 2 and 4, and a space for channel 3. The next group, not shown, would include a carrier pulse from channel 1, followed by a space for each of the remaining three channels.

Delay equalizers 52, 53, 54 and 55 are included in the biasing circuit to equalize the line lengths between pulse generator 51 and the respective rotators such that the biasing pulses are simultaneously applied to all the rotators. Typically, each equalizer can be a length of transmission line, or a lumped circuit delay network. A synchronization signal, derived from the carrier signal source, keeps the biasing pulse generator in proper synchronism with the channel signals.

Figure 3:
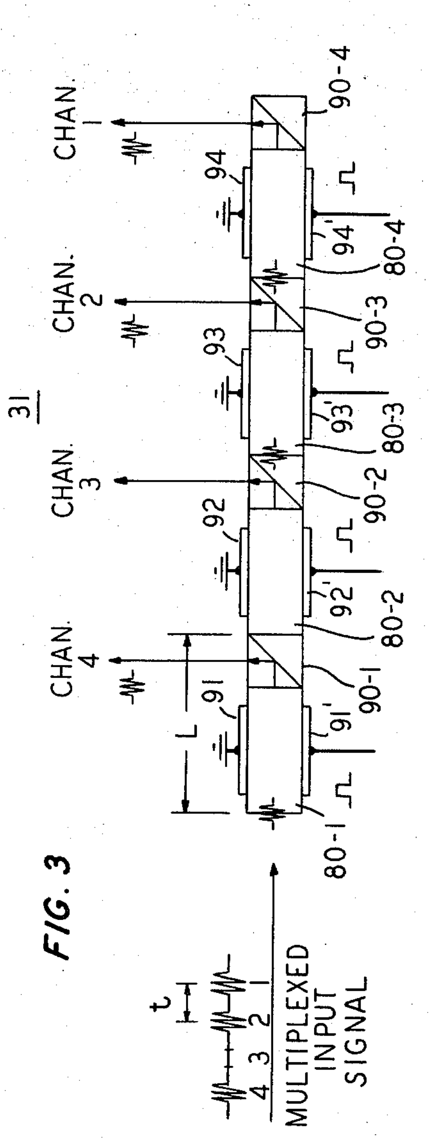
FIG. 3 shows the apparatus of FIG. 2 operating as a demultiplexer.

At the receiver, a demultiplexer, substantially identical to multiplexer 30, separates the several channels. Thus, as illustrated in FIG. 3, demultiplexer 31 comprises four polarization rotators 80–1, 80–2, 80–3 and 80–4, and associated polarization selective prisms 90–1, 90–2, 90–3 and 90–4 arranged as in the multiplexer. Biasing means 91–91′, 92–92′, 93–93′ and 94–94′ permit the application of a biasing pulse across the rotators.

In operation, the multiplexed input signal enters the demultiplexer through rotator 80–1, polarized such that the carrier pulses propagate through the prisms. Thus, the first signal bit, corresponding to channel 1, traverses the first three rotator-prism pairs and arrives at the input end of rotator 80–4 while the second signal bit passes through the first two rotator-prism pairs and arrives at the input end of rotator 80–3. By adjusting the repeat length $L$ and/or the velocity of propagation $v_o$, these two bits, and each of the remaining signal bits, arrive at the input end of one of the rotators at precisely the same instant. Simultaneously, biasing pulses are applied to the rotators, producing a 90° rotation in the direction of the wave polarization as the respective carrier pulses traverse the rotators. As a consequence, the carrier pulses enter the prisms such that they are deflected out of the prism side ports, leaving the demultiplexer along separate directions as indicated in FIG. 3. The process is repeated with each of the following groups of multiplexed signals, and the respective channel signals thereby separated.

EXAMPLE

Figure 4:
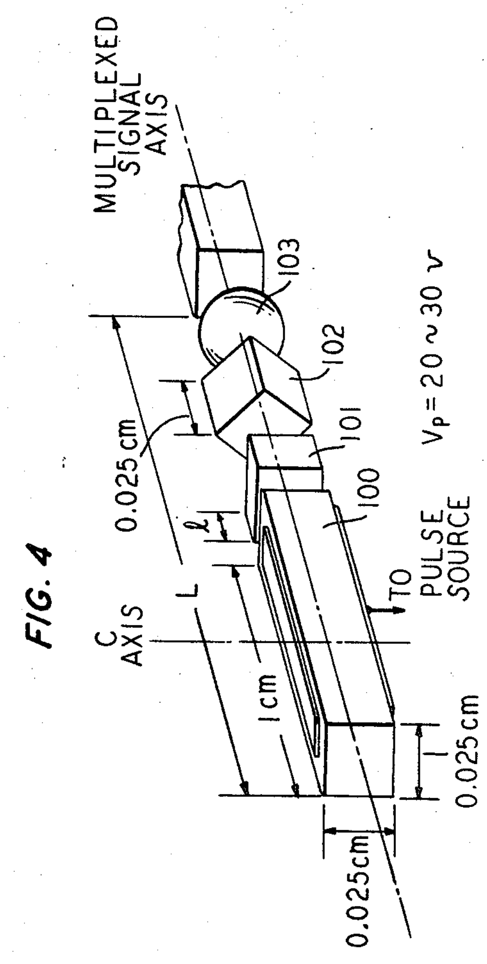
FIG. 4 shows, in somewhat greater detail, one element of the multiplexer-demultiplexer of FIG. 2.

FIG. 4 shows, in somewhat greater detail, one element of a multiplexer (demultiplexer), in accordance with the present invention, comprising an electrooptic polarization rotator 100; a polarization compensator 101; a polarization selective prisms 102; and a lens. For purposes of illustration, rotator 100 can be made of lithium tantalate ($LiTa0_3$), compensator 101 of either calcite or quartz, and prism 102 of calcite. Also shown are typical dimensions for the several elements. For example, the transverse dimensions for all the elements are given as 0.025 by 0.025 cm. The rotator length is of the order of 1.0 cm; the length $l$ of the compensator will depend upon the natural birefringence of the rotator material, as is explained hereinbelow; and the prism length is about 0.025 cm. The pulse amplitude, to effect 90° of polarization rotation in rotator 100, is between 20 to 30 volts.

It will be noted that the unit shown includes, in addition to the rotator and prism referred to hereinabove, extra elements such as a compensator and a lens. Both of these elements are optional. The compensator is included to effect a fixed birefringence, if required, to negate any natural birefringence in the rotator. It will be recalled that the prisms pass waves of one polarization and deflect orthogonally polarized waves. Hence, spurious rotational effects are to be avoided. This can be realized by making rotator 100 of a material having no natural birefringence at the operating temperature, or by the inclusion of a compensator, as illustrated in FIG. 4.

A focusing lens is included to prevent undue beam defraction. Alternatively, the ends of the rotator can be curved to effect focusing.

Assuming an overall repeat length $L$ of approximately 1 cm, and an average refractive index $n = 2$, the minimum temporal spacing $t$ between optical pulses (and, accordingly, the maximum biasing pulse width,) is $$t = \frac{L}{(c/n)} = \frac{1}{3\times10^{10}/2} \approx 0.7\times10^{-10} \text{ sec.} \quad (2)$$

or $t \approx 70$ picoseconds.

This timing limitation can be reduced by making $L$ shorter, i.e., using higher amplitude biasing pulses, or by using a different material, i.e., one that has a higher refractive index or a larger electrooptic coefficient.

The number of channels, $N$, that can be multiplexed, depends upon the bit rate F of the channels. As an example, for F = 200 Mhz, $$N = 1/Ft = 71 \text{ channels.} \quad (3)$$

For the illustrative embodiment described above, wherein $N = 4$, the bit rate per channel can be as high as $$F = 1/Ft = 3.93 \text{ Ghz} . \quad (4)$$

Figure 5:
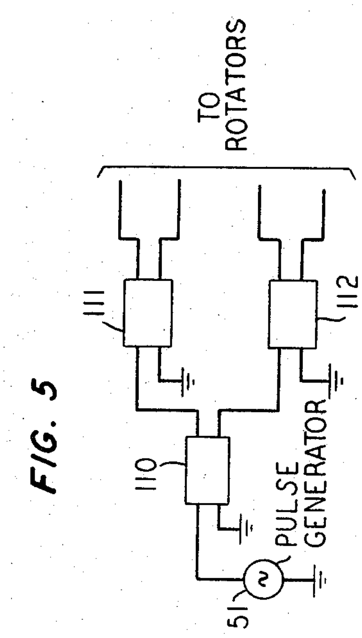
FIG. 5 shows an alternate arrangement for coupling the biasing pulse generator to the multiplexer-demultiplexer polarization rotators.

FIG. 5 shows an alternate arrangement for simultaneously coupling pulse generator 51 to the polarization rotators. This embodiment utilizes a binary fan-out comprising a plurality of magic-T type hybrid junctions 110, 111 and 112 arranged in the manner described by H. Seidel in United States Pat. Nos. 3,423,688 and 3,444,475.

Figures 6, 7:
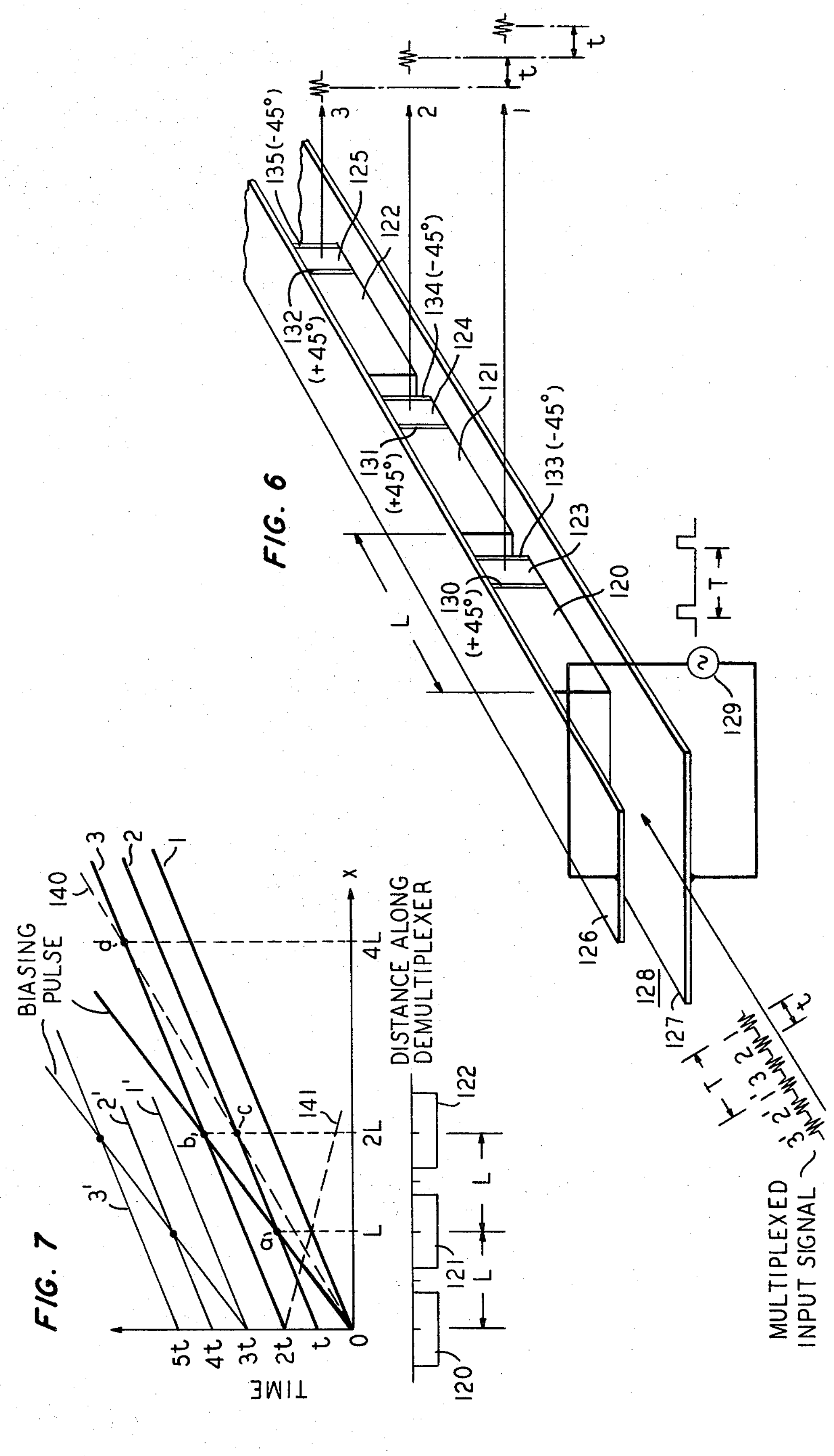
FIG. 6 shows an alternate embodiment of the invention wherein the biasing field is a traveling wave.
FIG. 7 illustrates graphically the operation of a traveling wave multiplexer-demultiplexer in accordance with the invention.

FIG. 6 shows an alternate embodiment of the invention wherein the biasing field is applied to the polarization rotators as a traveling wave. In this embodiment, the optical components, comprising polarization rotators 120, 121, and 122, and polarization selective prisms 123, 124 and 125 are located between the planar conductors 126 and 127 of a strip transmission line 128. To avoid the necessity of rotating the prisms 45°, as in the illustrative arrangement shown in FIG. 4, each of the prisms is preceded by fixed +45° rotators 130, 131 and 132, and followed by fixed −45° rotators 133, 134 and 135. These can be made of optically active crystals or by a combination of two quarter-wave plates.

For purposes of explanation, a three channel, multiplexed optical signal is shown directed at the rotator-prism pairs along with a pulsed biasing signal derived from a pulse generator 129. The timing is such that a biasing pulse and a carrier pulse, corresponding to channel 1, are in time coincidence at the center of the first rotator 120. This induces a 90° rotation in the direction of polarization of the channel 1 signal, resulting in its deflection out the side port of prism 123. By adjusting the distance $L$ between rotators, and the propagation velocities of the biasing signal and optical pulses, as will be explained in greater detail hereinbelow, the biasing pulse and the second carrier pulse, corresponding to channel 2, arrive in time coincidence at the center of the second rotator 121. This, in turn, induces a 90° rotation in the direction of polarization of the channel 2 signal, causing it to be deflected out the side port of prism 124. The process is repeated in the next rotator-prism pair resulting in the extraction of the channel 3 signal.

At the conclusion of the demultiplexing process, the biasing pulse is absorbed in a line-terminating impedance, not shown. The next biasing pulse is applied to the input end of line 128 along with the next group of channel signals 1', 2' and 3'.

The above-described operation of the traveling wave demultiplexer is illustrated graphically in FIG. 7, which is a plot of the positions of the carrier pulses and the biasing pulses as a function of time. Arbitrarily designating the center of rotator 120 as the zero position, and the time at which the channel 1 carrier pulse and the biasing pulse arrive there as zero time, the distance $L$ between rotators is adjusted such that the channel 2 curve intersects the biasing pulse curve at point $a$, a distance $L$ along the demultiplexer, corresponding to the center of rotator 121, and the channel 3 curve intersects the biasing pulse curve at point $b$, a distance $2L$ along the demultiplexer, corresponding to the center of rotator 122.

In terms of the optical signal velocity, $v_o$, the biasing pulse velocity, $v_b$, and the repeat distance $L$, the time, $t_1$, it takes for the biasing pulse to travel the distance $L$, and the time, $t_2$, it takes for the next adjacent pulse to overtake the bias pulse are given by $$t_1 = \frac{L}{v_b}, \quad (5)$$

and $$t_2 = \frac{L}{v_0} + t. \quad (6)$$

Since these must be equal, $$\frac{L}{v_b} = \frac{L}{v_0} + t, \quad (7)$$

and $$L = \frac{t}{\left(\frac{1}{v_b} - \frac{1}{v_0}\right)}. \quad (8)$$

Equation (8) relates to rotator-prism pair spacing $L$ to the signal velocities and the bit period $t$. The biasing pulse period $T$ is, of course, equal to $Nt$, where $N$ is the number of multiplexed channels.

It is apparent that as the relative propagation velocities change, the distance $L$ will also change. For example, if the biasing pulse velocity $v_b$ is increased, as indicated by the broken line 140 in FIG. 7, it will take longer for the optical pulses to overtake the bias pulse, resulting in an increase in the rotator-to-rotator spacing. This is indicated by the intersection points $c$ and $d$ which are spaced, respectively, distances $2L$ and $4L$ from the first rotator. This added spacing may be desirable if focusing lenses are to be inserted between adjacent rotators. It will also be noted that the biasing pulses and the optical pulses can, alternatively propagate in opposite directions, as indicated by the biasing pulse curve 141, which has a negative slope, indicating an opposite sense of direction.

One of the principal differences in the operation of the demultiplexer of FIG. 3 and the demultiplexer of FIG. 6 is that in the former the channels are extracted simultaneously, whereas in the latter, the channels are extracted sequentially. Accordingly, if the arrangement of FIG. 6 is used as a traveling wave multiplexer, the channels are coupled into the multiplexer sequentially, spaced apart a time $t$, rather than simultaneously, as in the embodiment of FIG. 2.

In all cases it is understood that the above-described arrangements are illustrative of but a small number of the many specific embodiments which can represent applications of the principles of the invention. Numerous and varied other arrangements can readily be devised in accordance with these principles by those skilled in the art without departing from the spirit and scope of the invention.

I claim:

1. Apparatus for use in a transmission system adapted to time division multiplex $N$ pulse-encoded optical signals for transmission along a common wavepath, comprising:

an array of $N$ cascaded polarization rotators, spaced apart a distance $L$, and $N$ associated polarization selective prisms;

said prisms being adapted to couple said $N$ pulse encoded optical signals polarized along a first direction between a side port of said prisms and an associated rotator, and to transmit, between adjacent rotators, said pulse encoded optical signals having a second direction of polarization rotated 90° to said first direction, and;

pulsing means coupled to said rotators for inducing a 90° rotation in the direction of polarization of selected pulses of optical wave energy propagating through said rotators.

2. Apparatus in accordance with claim 1 including;

means for coupling each of $N$ different pulse-encoded optical signals, polarized along said second direction, between a side port of a different one of said $N$ prisms and one of $N$ different wavepaths.

3. Apparatus in accordance with claim 2 wherein said optical signals are coupled in time synchronism.

4. Apparatus in accordance with claim 2 wherein said optical signals are coupled sequentially.

5. Apparatus according to claim 1 wherein said pulsing means changes simultaneously the rotation induced in all of said rotators.

6. Apparatus according to claim 1 wherein said pulsing means changes sequentially the rotation induced in said rotators.

7. The combination according to claim 1 including in association with each of said rotators, a polarization compensator and a focusing lens.

8. The combination according to claim 1 wherein said rotators and prisms are disposed within an electromagnetic wave transmission path; and wherein said pulsing means produces a traveling wave which propagates along said path at a velocity $v_b$.

9. The combination according to claim 8 wherein $$L = \frac{t}{\left(\frac{1}{v_b} - \frac{1}{v_0}\right)},$$

where $v_o$ is the average velocity of propagation of said optical wave energy, $F$ is the bit rate of each of said signals, and $t = 1/IN$.

* * * * *